(12) United States Patent
Blaschke

(10) Patent No.: US 7,353,810 B1
(45) Date of Patent: Apr. 8, 2008

(54) HEATING ELEMENT FOR FUEL TANK

(76) Inventor: Steven D. Blaschke, 4018 Victoria La., Avon, IN (US) 46123

( * ) Notice: Subject to any disclaimer, the term of this patent is extended or adjusted under 35 U.S.C. 154(b) by 94 days.

(21) Appl. No.: 11/301,051

(22) Filed: Dec. 12, 2005

(51) Int. Cl.
*F02M 31/12* (2006.01)
(52) U.S. Cl. .................. 123/549; 219/205; 123/557
(58) Field of Classification Search ............ 123/548, 123/557, 142.5 R, 179.21, DIG. 6, 549; 392/497, 392/498, 501, 502; 219/202, 205
See application file for complete search history.

(56) References Cited

U.S. PATENT DOCUMENTS

| | | | |
|---|---|---|---|
| 4,110,602 A * | 8/1978 | McDade | 219/523 |
| 4,684,786 A * | 8/1987 | Mann et al. | 392/441 |
| 5,105,063 A * | 4/1992 | Hockemier | 219/205 |
| 5,419,389 A * | 5/1995 | Hurner | 165/11.1 |
| 6,380,523 B1 * | 4/2002 | Jones, Sr. | 219/528 |
| 6,729,310 B2 * | 5/2004 | Ekstam | 123/516 |
| 6,839,508 B2 * | 1/2005 | Biess et al. | 392/462 |

* cited by examiner

*Primary Examiner*—Marguerite McMahon
(74) *Attorney, Agent, or Firm*—Robert C. Montgomery

(57) ABSTRACT

A heating element for a fuel tank takes the form of an immersion heater commonly used in process applications to heat the contents of a fuel tank. The heater would be encased within a well for ease of servicing and replacement as well as safety. The tank heater would be wired in parallel with an engine block heater and connected to a suitable power cord, which would be plugged into a receptacle powered by alternating current. This feature allows the energizing of two heaters from only power cord and is identical to the procedure followed for only the block heater. The thermostat would be provided with an operating thermostat to keep the diesel fuel at the proper temperature, as well as an over-limit termination device for safety purposes.

8 Claims, 4 Drawing Sheets

HEATING ELEMENT FOR FUEL TANK

RELATED APPLICATIONS

There are no previously filed, nor currently any co-pending applications, anywhere in the world.

BACKGROUND OF THE INVENTION

1. Field of the Invention

The present invention relates generally to fuel tank heaters, and more particularly, to a fuel tank heater immersed into the tank and fuel to prevent coagulation, gelling and/or freezing of the fuel therein.

2. Description of the Related Art

The difficulty of starting cars, trucks, and other motor vehicles on cold mornings is a common problem encountered daily for those that live in colder, northern climates. Vehicles that require diesel fuel for power are also susceptible to the fuel turning to a semi-solid state or gelling. Many diesel powered cold weather vehicles are equipped with block heaters, which keep the engine oil warm and thus allow for easier starting. However, this does nothing for the fuel tank, which is located away from the engine. If the fuel has gelled in the fuel tank, it will not go to the engine, no matter how warm it is. This difficulty is often the cause of long delays, which not only wastes time, but also affects productivity and costs in the case of business users who suffer delays. Accordingly, there exists a need for a means by which diesel fuel tanks on trucks and similar vehicles can be kept warm to facilitate easy starting in cold weather climates.

A search of the prior art did not disclose any patents that read directly on the claims of the instant invention; however, the following references were considered related:

U.S. Pat. No. 3,929,187, issued in the name of Hurner, discloses a vibration resistant heat exchanger for preheating viscous fuels;

U.S. Pat. No. 4,237,850, issued in the name of Connor et al., discloses a mechanism for heating diesel fuel including a heat exchange conduit, a portion of which is submerged or contained within a fuel tank;

U.S. Pat. No. 4,726,346, issued in the name of Lucht, discloses a device for heating diesel fuel;

U.S. Pat. No. 4,807,584, issued in the name of Davis, discloses a fuel tank heating system;

U.S. Pat. No. 4,865,005, issued in the name of Griffith, discloses a heater for diesel fuel contained in a fuel tank;

U.S. Pat. No. 5,981,910, issued in the name of Williams et al., discloses a heated thermal filter cover maintaining a fluid filter and fluid above a gelling temperature; and U.S. Pat. No. 6,380,523, issued in the name of Jones, Sr., discloses a tank heating apparatus for preventing coagulation or gelling of diesel fuel.

Consequently, there exists a continuous need for new ideas and enhancements for existing products in the areas of preventing freezing or gelling of fuel in a fuel tank.

SUMMARY OF THE INVENTION

It is therefore an object of the present invention to provide a combination block heater and heating element for a fuel tank, thereby providing optimum warmth to an automobile in cold climates.

It is a feature of the present invention to provide a heating element that includes external threads that mateably align with the internal threads of a fuel spout, wherein the heating element threads into the fuel spout in a manner similar to a threaded fuel cap.

It is a feature of the present invention to provide a heating element that includes external threads that mateably align with the internal threads of an opening placed into the fuel tank, wherein the heating element directly warms the stored fuel therein.

Briefly described according to one embodiment of the present invention, a heating element for a fuel tank takes the form of an immersion heater commonly used in process applications to heat the contents of a fuel tank. The heater would be encased within a well for ease of servicing and replacement as well as safety. The tank heater would be wired in parallel with an engine block heater and connected to a suitable power cord, which would be plugged into a receptacle powered by alternating current. This feature allows the energizing of two heaters from only power cord and is identical to the procedure followed for only the block heater. The thermostat would be provided with an operating thermostat to keep the diesel fuel at the proper temperature, as well as an over-limit device for safety purposes.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within FIGS. 1 through 5.

1. Detailed Description of the Figures

Figure 1:
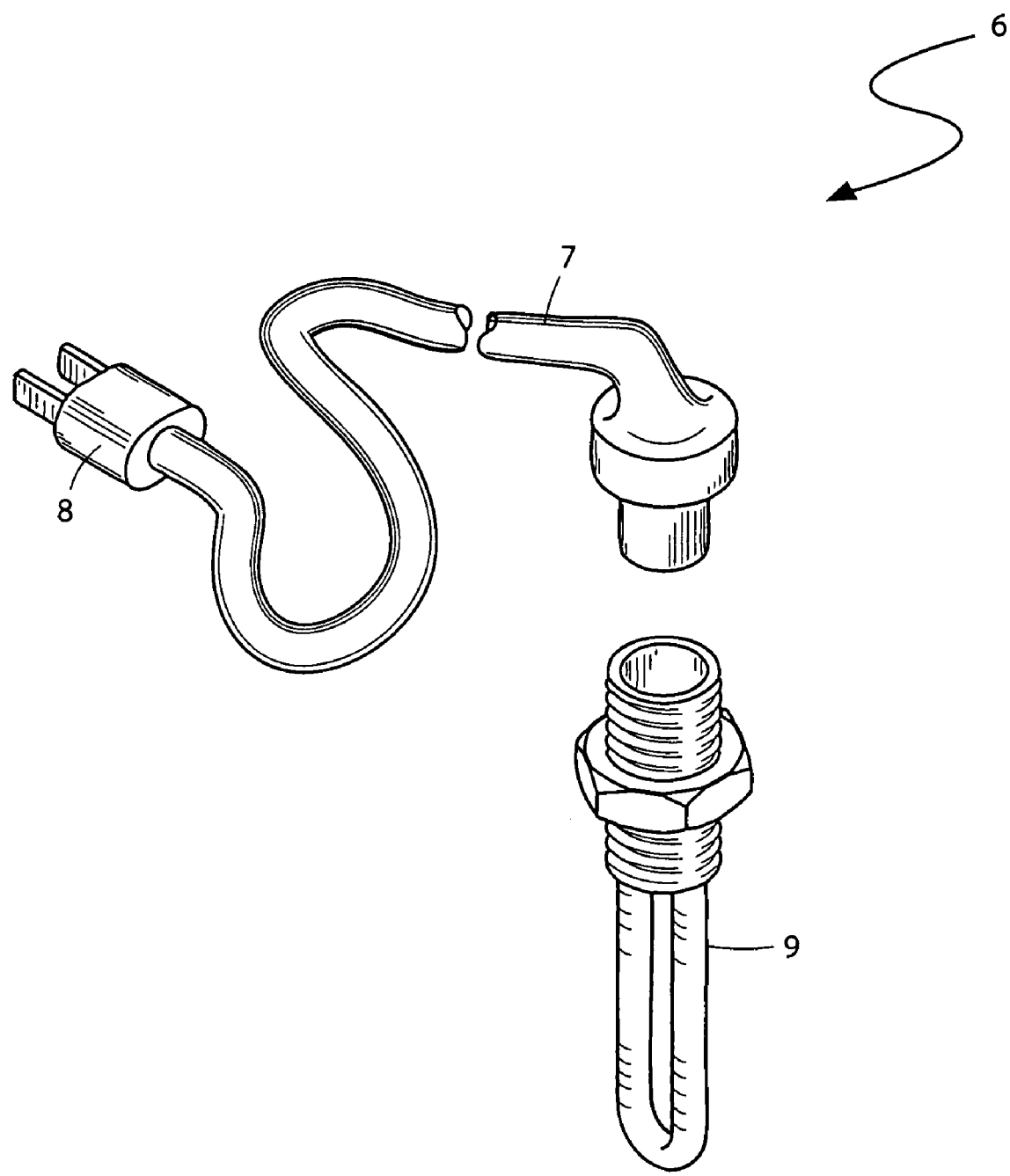
FIG. 1 is a perspective view of a block heater commonly known in the prior art.
Figure 2:
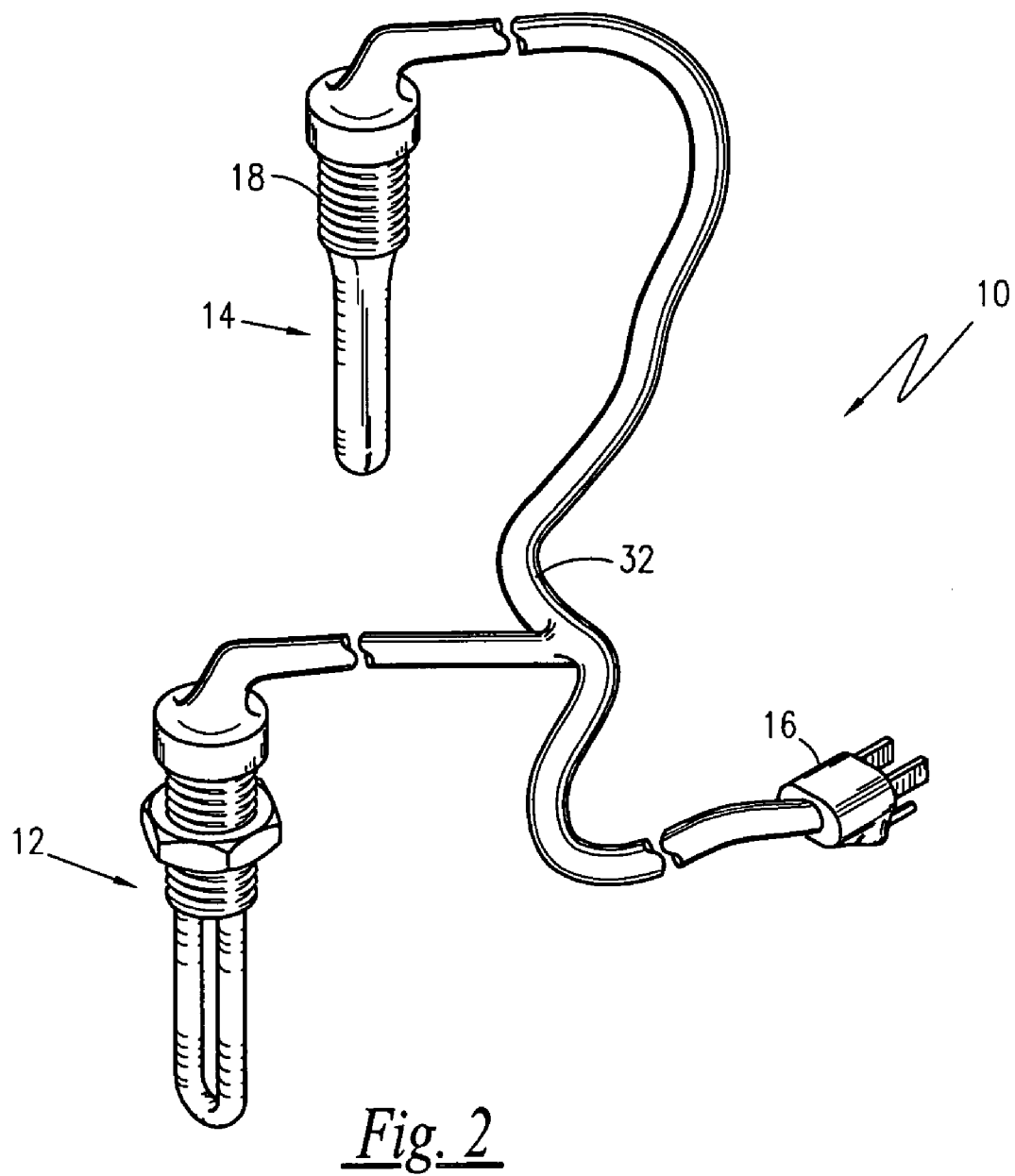
FIG. 2 is a perspective view of a combination of block heater and heating element for a fuel tank.
Figure 3:
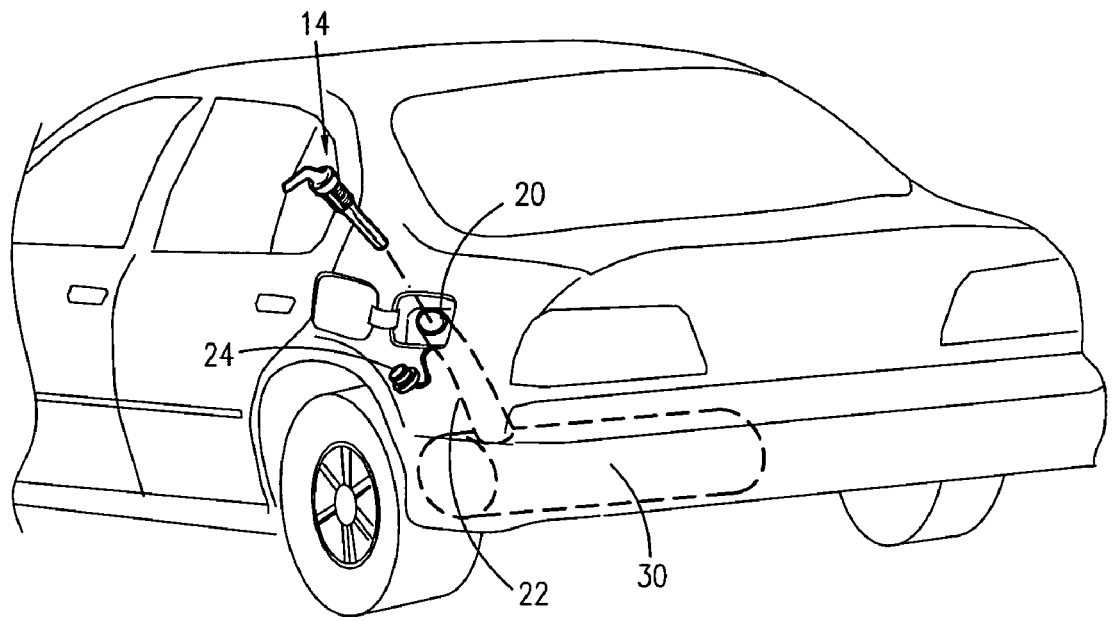
FIG. 3 is a perspective view of the combination block heater and heating element for a fuel tank appropriately positioned about an automobile.

Referring now to FIG. 1, a block heater 6 is well known in the art for providing warmth to an engine block, especially the oil pan, thereby preventing coagulation, gelling or freezing of engine oil, which may result in difficult start-up or engine failure, thus requiring costly repair and inconvenience. As shown, a separate block heater 6 comprises an electrical cord 7 and plug 8 coupled to a probe 9, wherein the electrical cord 7 and plug 8 transmits electricity to a probe 9 thereby generating heat and operating to warm the engine oil.

Referring now to FIG. 2 through FIG. 5, a combination of a block heater and heating element for a fuel tank 10 is shown in accordance with a preferred embodiment of the present invention. The combination 10 comprises a block heater 12 (generally known in the art as previously described and embodied by FIG. 1) electrically coupled by an insulated cord 32 with a separate heating element 14 for a fuel tank 30. The block heater 12 and heating element 14 are supplied electrical power via a plug 16. The block heater 12 is placed in the standard configuration with the engine block, while the heating element 14 comprises external threads 18 at an upper end (along an external circumferential surface of the upper end) for mating with the internal threads 20 of the elongated fuel tank spout 22 upwardly depending from the fuel tank 30. In this way, the external threads 18 of the heating element 14 mimics the threading action of a fuel cap 24. The heating element 14 further comprises a probe 26 depending from the upper end, and a thermostat 28. The probe 26 transmits the generated heat down the spout 22 and into the fuel tank 30. The thermostat 28 maintains the generated heat at predetermined temperature ranges, with a cut-out mechanism included to prevent the heating element 14 from over warming the fuel. The cut-out mechanism is envisioned as preventing the temperature from escalating above 100° F. It is also envisioned that the block heater 12 will also have a thermostat 34 for similar temperature control maintenance.

Figure 4:
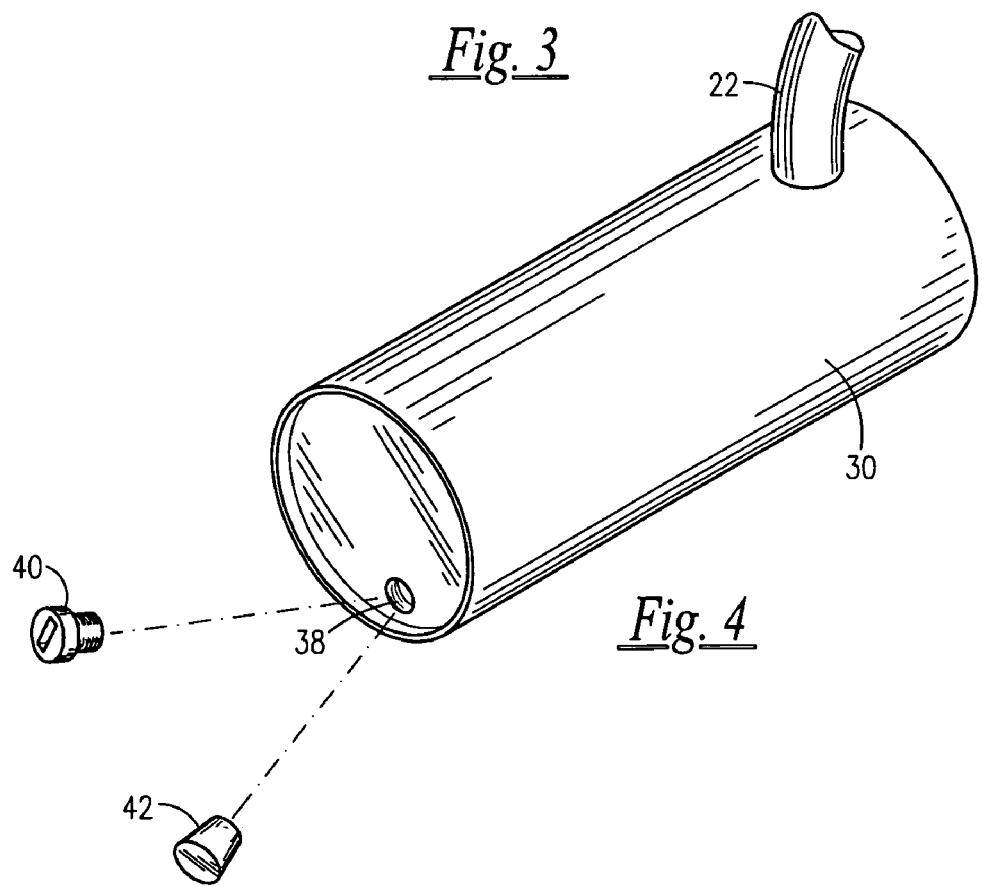
FIG. 4 is a perspective view of the combination block heater and heating element for a fuel tank appropriately positioned in the fuel tank of an automobile.
Figure 5:
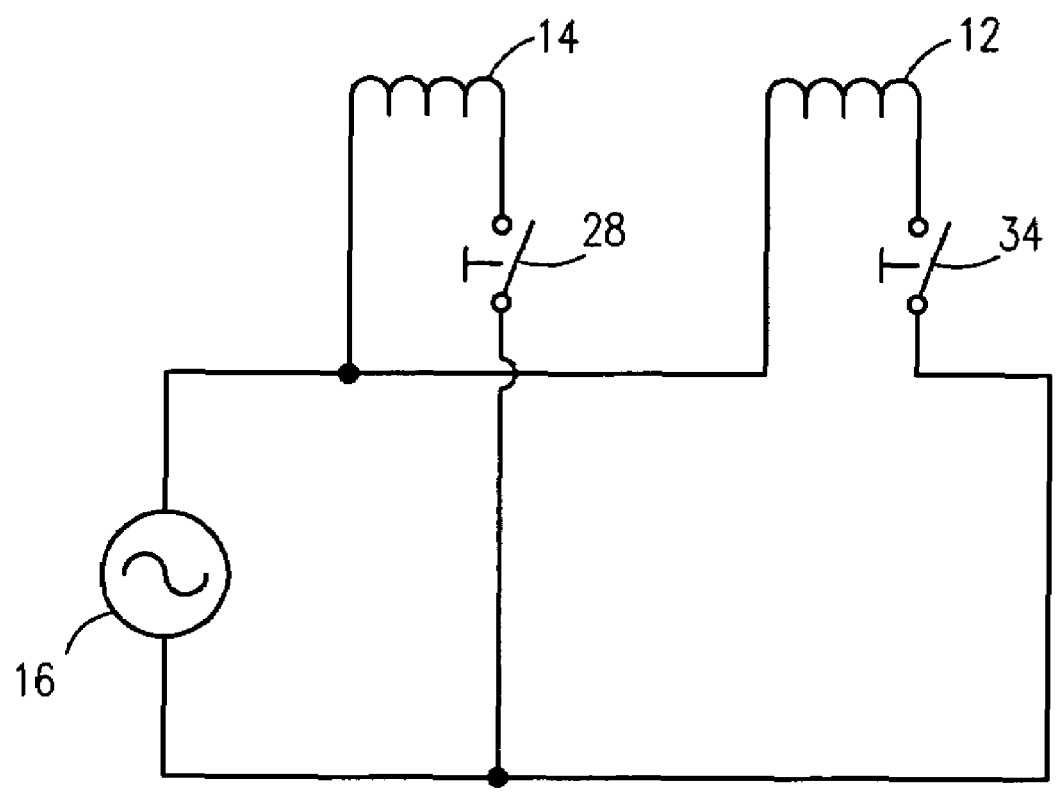
FIG. 5 is a schematic diagram of the electrical circuitry of the combination.

Referring specifically to FIG. 4, the combination 10 is depicted as being inserted through an opening or hole 36 drilled into or cut into the fuel tank 30. The opening or hole 36 is cut or drilled near the base or bottom of the tank 30 so that the fuel is warmed from the bottom upward, thereby warming the smallest amount of fuel that might be left in the tank 30. In one embodiment, the opening or hole 36 may include threads 38 mateable with the external threads 18 of the heating element 14, and wherein the opening or hole 36 is sealed by a mateable fuel tank cap 40 similar to the fuel cap 24 of the automobile. In another embodiment envisioned, the opening or hole 36 may include a bung 42 or other similar mechanism for sealing the opening or hole 36, thereby preventing the fuel from leaking therefrom. It is envisioned that the bung 42 seals the opening or hole 36 by a frictional interference fit or other similar means.

It is envisioned that the cord 16 of the combination 10 is sufficiently long to accommodate the placement of the block heater 12 and heating element 14, respectively, and generally opposite ends of an automobile, since most automobiles are designed with the engine at the front and the fuel spout and tank at the rear. Thus, the preferred embodiment envisioned by this invention includes a cord 16 of sufficient length to achieve placement of the block heater 12 at the engine and the heating element 14 at the fuel tank spout.

The combination of the block heater 12 and heating element 14 with a single plug 16 is particularly advantageous as requiring only one apparatus to plug into an electrical outlet, thereby maximizing the efficiency of electricity use during colder months when electrical demand and costs are directly proportional.

It is envisioned that the block heater 12 and/or the heating element 14 (and specifically, the probes of each, respectively) are encased or coated with an aluminum covering to prevent damage to the probe(s) by exposure to fuels, other liquids and other environmental elements that may corrode the probes and result in ineffectiveness or failure of the combination 10.

The combination 10 may also include temperature controls for effectively pre-setting the desired temperature ranges of the block heater 12 and/or heating element 14 separately. It is further envisioned that the combination 10 may be installed as a factory option or as an aftermarket addition, especially attractive to those that use diesel fuel and/or live in colder climates. The combination 10 is manufactured from lightweight, durable and readily available materials, thereby enhancing the life span of the combination 10 and reducing the cost to both manufacturer and consumer. The combination 10 is intended to save the consumer time and money by providing a reliable apparatus for maintaining the fuel and engine oil of a car at sufficiently warm temperatures for operation, reducing tardiness or absenteeism in the work place, reducing expense in repair and maintenance of the automobile and reducing the stress that accompanies the aforementioned scenarios.

2. Operation of the Preferred Embodiment

To use the present invention, in accordance with a preferred embodiment of the present invention, a user will place the block heater 12 in the appropriate position to the engine block, and then threadingly affix the heating element 14 within the fuel spout (replacing the fuel cap). The user will then place the plug 16 into an appropriate electrical outlet. If a thermostat setting is provided, the user may specify the temperature range that the heater 12 and element 14 may safely operate within. The user will then allow the combination 10 to warm the engine block and fuel of an automobile until use of the automobile is required. At that time, the plug 16 is removed from the outlet, and the heater 12 and element 14 are removed from their respective positions. The automobile is ready for safe operation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A block heater for warming an automobile engine in combination with a separate heating element for an automobile fuel tank, wherein said combination comprises:
   said heating element comprising an upper end and including threads mateable to threads of said fuel tank, and a probe depending from said upper end, said probe transmitting generated heat in accordance with a thermostat provided therein, said heat transmitted to fuel in said fuel tank;
   said block heater electrically coupled to said heating element via an insulated cord, said cord sufficient in length to accommodate placement of said block heater at said engine and said heating element at said fuel tank; and,
   an electrical plug electrically and operatively coupled with said block heater and said heating element, said plug transmitting electricity from an outlet to said block heater and said heating element so as to generate said heat;
   wherein said threads of said heating element are provided along an external circumferential surface of said upper end;
   wherein said internal threads of said fuel tank are provided in an elongated fuel spout upwardly depending from said fuel tank, said spout threadably accommodating said heating element in a manner similar to said fuel cap for said spout;

wherein said probe transmits heat down said spout and into said fuel tank and fuel.

2. The combination of claim 1, wherein said threads of said heating element are mateable to internal threads of said fuel tank.

3. The combination of claim 2, wherein said internal threads of said fuel tank are provided in a lower surface of said fuel tank.

4. The combination of claim 3, wherein said internal threads of said fuel tank are provided in an opening channeled into said fuel tank.

5. The combination of claim 4, wherein said opening is sealable via a threadable fuel tank cap.

6. The combination of claim 4, wherein said opening is sealable via a bung inserted and impinged by frictional interference fit.

7. The combination of claim 1, wherein said thermostat maintains heat at predetermined temperature ranges, and wherein said thermostat terminates heat generation above a predetermined temperature.

8. The combination of claim 7, wherein said predetermined temperature is approximately 100° Fahrenheit (F).

* * * * *